United States Patent [19]

Ichikawa

[11] 3,836,718

[45] Sept. 17, 1974

[54] INTERCOMMUNICATION SYSTEM WITH A TIME LIMITED ADVANCE NOTICE SIGNAL

[75] Inventor: Shigemasa Ichikawa, Nagoya, Japan

[73] Assignee: Aiphone Kabushiki Kaisha, Aichi-ken, Japan

[22] Filed: Dec. 29, 1972

[21] Appl. No.: 319,709

[30] Foreign Application Priority Data

May 6, 1972 Japan ............................... 47-53068
May 6, 1972 Japan ............................... 47-44866

[52] U.S. Cl. .............................................. 179/1 H
[51] Int. Cl. .......................................... H04m 11/00
[58] Field of Search..... 179/1 H, 1 CN, 1 HF, 84 R, 179/84 T, 175.2 C, 1 MN

[56] References Cited

UNITED STATES PATENTS

| | | | |
|---|---|---|---|
| 2,881,250 | 4/1959 | Blow | 179/1 H |
| 3,243,512 | 3/1966 | Liberman | 179/1 H |
| 3,283,073 | 11/1966 | Campbell | 179/1 H |
| 3,466,403 | 9/1969 | Combridge | 179/84 T |
| 3,532,820 | 10/1970 | Holm | 179/1 H |
| 3,668,331 | 6/1972 | Warner | 179/37 |

*Primary Examiner*—Kathleen H. Claffy
*Assistant Examiner*—Jon Bradford Leaheey
*Attorney, Agent, or Firm*—Wenderoth, Lind & Ponack

[57] ABSTRACT

An intercommunicating system provided with at least one generator which produces an advance notice signal controlled by a capacitor for supplying a time-limit bias to the generator whenever an intercommunicating station starts its operation, whereby another station or other stations can be forewarned that some intercommunicating station is cutting in or is ready for listening to.

10 Claims, 5 Drawing Figures

INTERCOMMUNICATION SYSTEM WITH A TIME LIMITED ADVANCE NOTICE SIGNAL

BACKGROUND OF THE INVENTION

The invention relates to intercommunicating systems.

Conventional intercommunicating systems, especially those comprising a master station and remote stations, are accompanied by the disadvantageous possibility of eavesdropping. That is, if an operator at a first intercommunicating station (hereinafter referred to as station I) selects a second intercommunicating station (hereinafter referred to as station II) by picking up a handset or by operating a control switch, he can secretly listen to what is being said at the area covered by station II.

In order to overcome such a drawback, conventional intercommunicating systems have been improved by the additional provision of switches for preventing eavesdropping, which switches are used to open and close the intercommunicating lines.

However, in spite of this improvement, conventional intercommunicating systems are subject to still another disadvantage caused by the improvement; that is, when station II is called by station I, an operator in the area covered by station II must go to the position where the intercommunicating set of station II is installed, in order to close the intercommunicating lines.

In addition, a conventional intercommunicating system in which any of the intercommunicating stations can freely cut into a conversation or communicate with other intercommunicating station is disadvantageous in that the operators at the other stations cannot be informed beforehand that some station is going to cut in.

SUMMARY OF THE INVENTION

A first object of the invention is accordingly to provide a novel intercommunicating system in which all of the above-described drawbacks accompanying the conventional intercommunicating systems can be eliminated.

A second object of the invention is to provide a novel intercommunicating system in which, when an operator at a station starts operating its intercommunicating set, an advance notice signal is transmitted therefrom to other stations where operators are talking to each other, whereby they can be informed beforehand of the fact that someone is cutting into their conversation or communication.

A third object of the invention is to provide a novel intercommunicating system in which, when a master station calls a remote station, the master station transmits an advance notice signal to the remote station, whereby eavesdropping on the remote station by the master station can be avoided.

A fourth object of the invention is to provide a novel intercommunicating system in which a first intercommunicating station transmits an advance notice signal to a second intercommunicating station by only the operation of selecting the second intercommunicating station, whereby the second intercommunicating station can confirm the fact that the first intercommunicating station is listening to the second station.

The foregoing objects and other objects as well as the characteristic features of the invention will become more apparent from the following detailed description and the appended claims when read in conjunction with the accompanying drawings, in which like parts are designated by like reference symbols or numerals.

DETAILED DESCRIPTION OF THE INVENTION

Before describing preferred embodiments of the invention in detail it is advisable to describe the basic circuit of a generator which produces an advance notice signal according to the invention.

Figure 1:
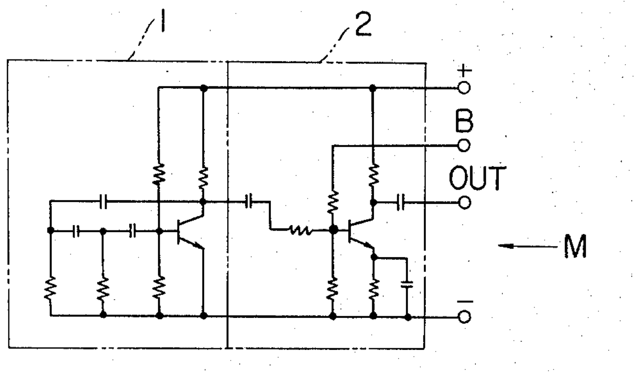
FIG. 1 is a circuit diagram illustrating a generator for producing an advance notice signal which is utilized in the intercommunicating system according to the invention.

As conducive to a full understanding of this invention, the basic circuit of a generator suitable for use in producing advance notice signals according to the invention will first be briefly described. The generator M, as illustrated in FIG. 1, comprises an oscillator 1 and an amplifier 2 which are well known in the art. This generator M operates as follows.

The oscillator 1 is activated when fed with an electric current through terminals (+) and (−) from its power source (not shown), while the amplifier 2 is activated when fed with an electric current through the terminals (+) and (−) and a termianl B which is provided for receiving a time-limit bias (described hereinlater).

The oscillator 1 oscillates at an oscillation frequency determined by its circuit constant, and its oscillation output is amplified through the amplifier 2 and coupled to its output terminal OUT. If the supply of the electric current through the terminal B to the generator M is stopped, the amplifier 2 will stop its operation, but the oscillator 1 will continue its operation. If the electric current supplied through the terminals (+), (−) and B is stopped, both the operations of the oscillator 1 and the amplifier 2 will be stopped.

Figure 2:
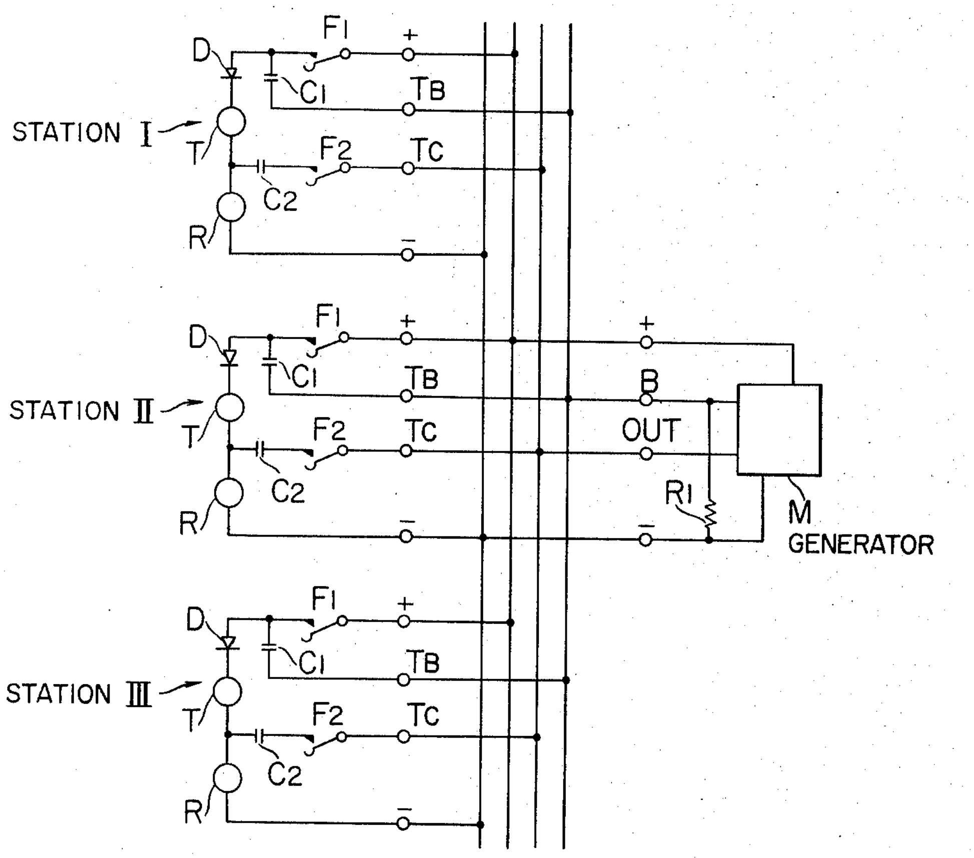
FIG. 2 is a schematic diagram showing a first example of the intercommunicating system of the invention which comprises a plurality of intercommunicating station and the generator shown in FIG. 1.

With reference to FIG. 2, there is shown a first example of the intercommunicating system of the invention which comprises the generator M described above and intercommunicating stations I, II and III whose circuits are the same.

Each of the stations I, II and III comprises a transmitter T, a receiver R connected to the transmitter, a hook-switch $F_1$ connected to the transmitter T through a diode D provided for preventing crosstalk during a waiting period, a capacitor $C_1$ which is connected to the diode D and the hook switch $F_1$ and provided for supplying a time-limit bias to the generator M, a d.c. blocking capacitor $C_2$ connected to the transmitter T and, the receiver R, another hook switch $F_2$ connected to the capacitor $C_2$. The hook-switches $F_1$ and $F_2$ open and close their respective circuits in cooperation with a handset constituted by the transmitter T and the receiver R.

Each station further comprises terminals (+) and (−) connected respectively to the hook-switch $F_1$ and the receiver R, a terminal $T_B$ connected to the capacitor $C_1$, for supplying the time-limit bias, and a terminal $T_C$ connected to the hook-switch $F_2$. These terminals (+), (−), $T_B$ and $T_C$ are connected respectively to the terminals (+), (−), B and OUT of the generator M described with reference with FIG. 1. A resistor $R_1$ connected between the terminals B and (−) of the generator M is a resistor used for discharging the capacitors $C_1$.

The operation of the intercommunicating system illustrated in FIG. 2 will now be described. In the following description, it should be noted that a calling circuit is omitted in FIG. 2 for the purpose of simplifying the drawing.

It is assumed that station I is calling station II, and both operators at stations I and II have picked up or unhooked their respective handsets. Therefore, a d.c. current flows in a closed loop circuit formed by the terminal (+), hook-switch $F_1$, diode D, transmitter T, receiver R and terminal (−) in station I, and therefore it becomes possible for the operator at station I to talk to an operator at station II through a circuit formed by the transmitter T, capacitor $C_2$, hook-switch $F_2$ and terminal $T_C$ of station I, lines connected between stations I and II, and the terminal $T_C$, hook-switch $F_2$, capacitor $C_2$ and receiver R of station II.

When an operator at another station (station III in this case) picks up its handset, the hook-switches $F_1$ and $F_2$ of station III close simultaneously. As a result, an electric current is applied to the terminal B of the generator M through the terminal (+), hook-switch $F_1$, capacitor $C_1$, and terminal $T_B$ of station III and a line connected between station III and the generator M, whereby an oscillation output of the generator M is produced.

The oscillation output thus produced is applied to stations I and II through the terminal OUT of the generator M, the hook-switches switches $F_2$ and capacitors $C_2$ of stations I and II, thereby to operate the receivers R of stations I and II, respectively. Accordingly the operators at stations I and II are informed beforehand of the fact that some station (in this case, station III) is cutting into their conversation.

In this connection even if the handset were kept unhooked at station III, the operation of the generator M would stop soon because, when the capacitor $C_1$ of station III is charged, the application of current to the terminal B of the generator M is stopped. Therefore, the conversation between the operators at stations I and II will not be interrupted by station III.

Then, at station III, if the handset is put back on its intercommunicating set, the hook-switch $F_1$ is opened whereby the circuit for charging the capacitor $C_1$ is interrupted. As a result, the capacitor $C_1$ is discharged through the resistor $R_1$ thereby to become ready for the next operation.

Figure 3:
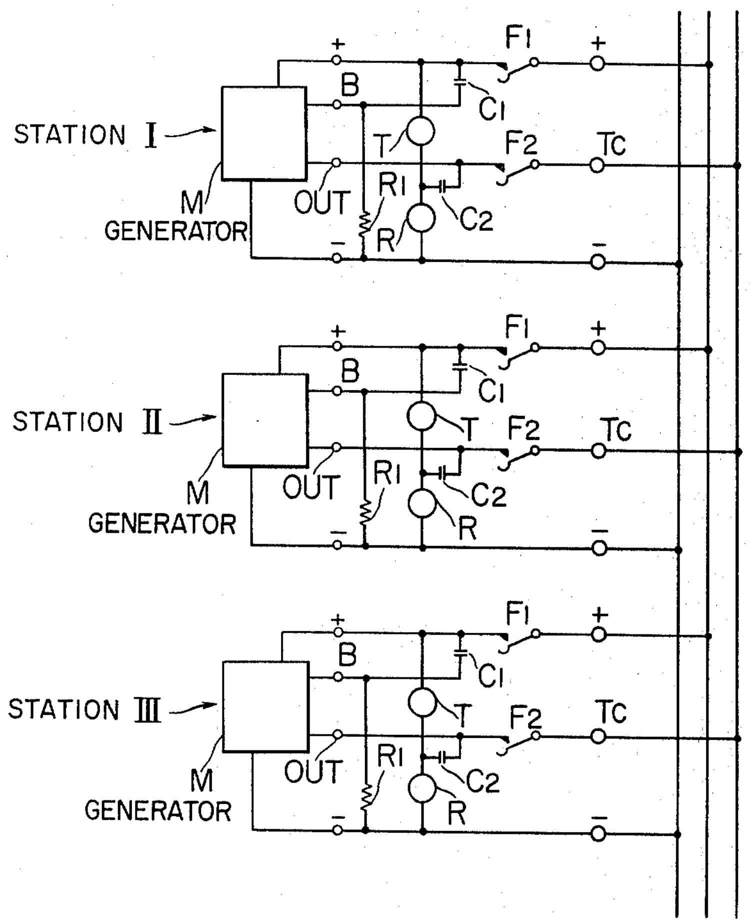
FIG. 3 is also a schematic diagram illustrating a second example of the intercommunicating system of the invention in which each of the intercommunicating stations is equipped with the generator shown in FIG. 1.

A second example of the intercommunicating system of the invention, as shown in FIG. 3, comprises a plurality of intercommunicating sets each of which incorporates the generator M disclosed with reference to FIGS. 1 and 2.

In this example, one terminal of the capacitor $C_1$ for supplying the time-limit bias to the generator M is connected directly to the terminal B of the generator M in each of the stations. Therefore, the terminal $T_B$ illustrated in FIG. 2 can be eliminated from each of the stations, and the number of the lines connected between the stations in this example is less by one than that in the first example. Owing to this elimination of one line, all of the stations are separated from one another by the hook-switches $F_1$ and $F_2$. Therefore, the diodes D provided for preventing crosstalk in FIG. 2 can also be eliminated. The other components and their functions are the same as those described with respect to FIG. 2.

The intercommunicating system described above with reference to FIG. 3 will be described. In this case also, it is assumed that station I is calling station II, and the handsets have been unhooked by the operators at the stations I and II.

If, while the operators at stations I and II are talking to each other through the intercommunication system described above, an operator at station III unhooks its handset, an electric current will be fed to the generator M of station III through the hook-switch $F_1$ which has been closed by unhooking the handset and the capacitor $C_1$, whereby the generator M will produce an oscillation output.

The oscillation output thus produced is applied to stations I and II through the hook-switch $F_2$ of station III, thereby to operate the receivers R of the stations I and II. Therefore, the operators at stations I and II can be informed beforehand of the fact that some station (in this case, station III) is cutting into and listening to their conversation.

Thereafter, the intercommunicating system operates in the same manner as in the first example.

The first and second example have been described with respect to the case where the operator at station III cuts into the conversation between the operators at stations I and II. It is obvious that the operations of the intercommunicating systems are also the same in the case where the operator at station I picks up the handset while the operators at stations II and III are talking to each other, and in other cases.

The present invention can be applied to existing conventional intercommunicating systems which have already been installed. That is, if there is available one extra line among the lines run between the stations of the conventional intercommunicating system, the extra line can be used as a line for supplying the time-limit bias to the generator M, as described with reference to FIG. 2. In the case where an extra line is not available, one generator M is connected to each of the communicating sets as illustrated in FIG. 3. In this case it should be noted that no additional line is installed between the stations.

The above-described examples have been described with respect to intercommunicating systems equipped with handsets. However, the present invention can be applied to simultaneous intercommunicating system equipped with loudspeakers and to press-to-talk type intercommunicating systems comprising a master station and remote stations in the same manner as described above.

In this connection, the press-to-talk type intercommunicating system according to the invention will be described as a third example of the invention. In this system, as outlined in FIG. 4, the generator M described previously is connected in parallel to an amplifier A, and a power source E is used to supply an electric current to the generator M and an amplifier A.

Figure 4:
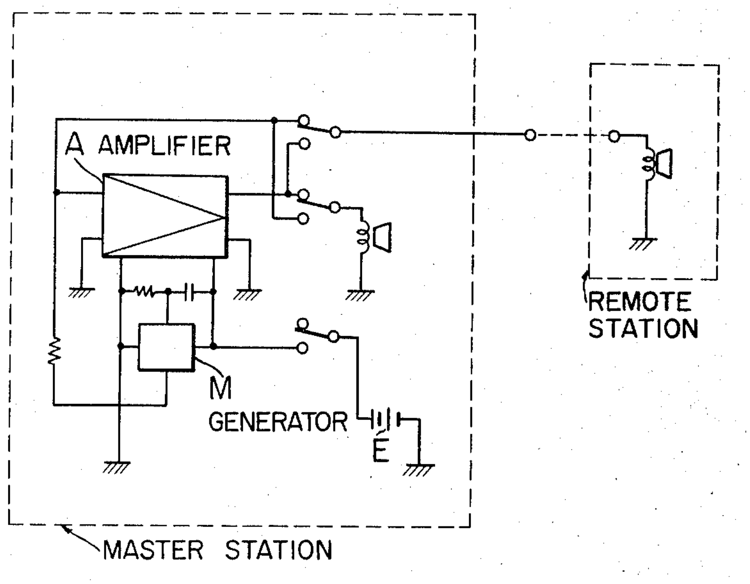
FIG. 4 is a circuit diagram indicating the essential parts of a third example of the intercommunicating system of the invention, which system comprises a master station and remote stations.
Figure 5:
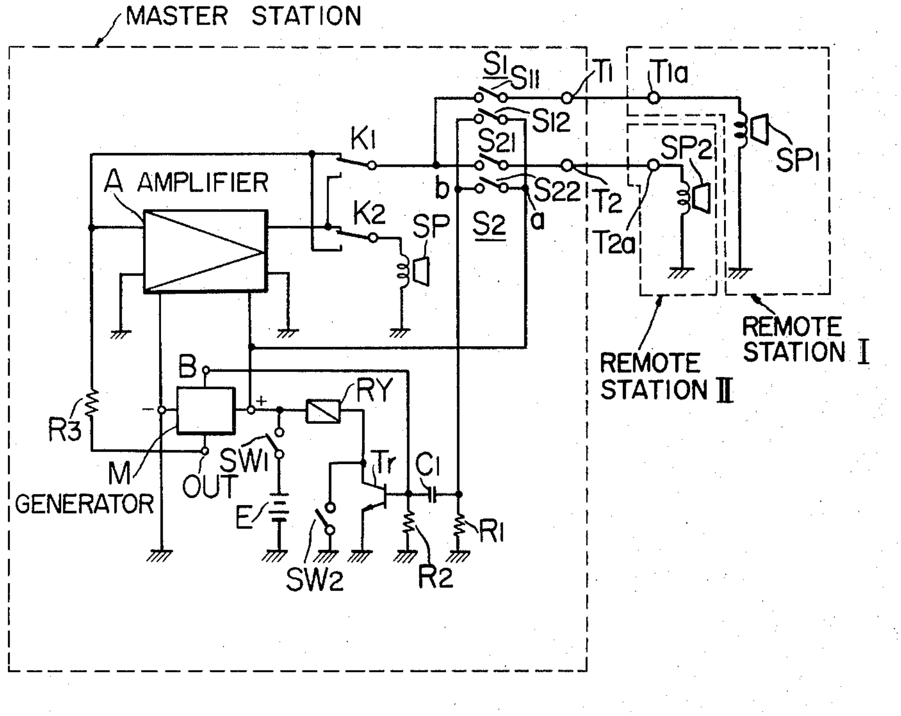
FIG. 5 is a schematic diagram illustrating another example of the intercommunicating system of the invention.

Although FIG. 4 illustrates the system provided with a single remote station, another example in which a plurality of remote stations are provided will be described with reference to FIG. 5, in which a calling circuit is omitted for the purpose of simplification. The amplifier A is constituted by transistors, resistors, capacitors transformers the like. The positive terminals of the amplifier A and the generator M are connected through a power switch $SW_1$ to the positive terminal of the power source E, while the negative terminals thereof are connected through the ground to the negative terminal of the power source E.

The press-to-talk type communicating system further comprises switches $S_1$ and $S_2$ for selecting stations (hereinafter referred to as station selecting switches). These switches $S_1$ and $S_2$ have contacts $S_{11}$ and $S_{12}$, and contacts $S_{21}$and $S_{22}$, respectively, and operate cooperatively with the switch $SW_1$. The contacts $S_{12}$ and $S_{22}$ are connected in parallel and on their side *a* are connected to the terminal (+) of the generator M, while on their other side *b* they are connected through a capacitor $C_1$ which is provided for supplying the time-limit bias to the generator M, to the base of a switching transistor $T_r$ and to the terminal B of the generator M. The collector of the transistor $T_r$ is connected to the switch $SW_1$ through a relay RY, while the emitter thereof is directly grounded.

The relay RY has transfer-contacts $K_1$ and $K_2$ for two circuits. The armature of the transfer-contact $K_1$ is connected through the contacts $S_{11}$ and $S_{21}$ respectively to terminals $T_1$ and $T_2$, while the armature of the transfer-contact $K_2$ is connected to a loudspeaker-and-microphone combination SP.

The transistor $T_r$ is provided with a switch $SW_2$ between the collector and the emitter. The switch $SW_2$ is operated so as to switch over the transmission and reception in communication through the contacts $K_1$ and $K_2$, which are operated by the relay RY.

The interconnecting system further comprises resistors $R_1$ and $R_2$ for discharging the capacitor $C_1$, a resistor $R_3$ for connecting the generator M to the amplifier A, loudspeaker-and-microphones $SP_1$ and $SP_2$ provided respectively at remote statons I and II, and terminals $T_{1a}$ and $T_{2a}$ of the loudspeaker-and-microphones $SP_1$ and $SP_2$.

The operation of the intercommunicating system described above is as follows. It should be remembered that the calling circuit is omitted from FIG. 5.

Initially, the power switch $SW_1$ is kept open, thereby to stop the operation of the system. Upon depression of the station-selecting switch $S_1$ at the master station, the power switch $SW_1$ is closed, as a result of which an electric current is applied to the amplifier A and the generator M, while a bias is applied to the base of the transistor *Tr* through the circuit formed by the positive terminal (+) of the power source E, the power switch $SW_1$, the contact $S_{12}$, and the capacitor $C_1$.

Accordingly, the switching transistor becomes conductive and therefore an electric current flows in the closed loop circuit forme by the positive terminal of power source E, the power switch $SW_1$, the relay RY, the collector of the transistor *Tr*, the emitter of the same, ground and the negative terminal of the power source E, whereby the armatures of the contacts $K_1$ and $K_2$ are tripped over to the transmission sides thereof. At the same time, the time-limit bias described previously is applied to the terminal B of the generator M through the circuit formed by the positive terminal of power source E, the power switch $SW_1$, the station selecting switch $S_1$, and the capacitor $C_1$, whereby the generator M produces the oscillation output.

The oscillation output thus produced is applied to the amplifier A through the resistor $R_3$ and amplified thereby. Thereafter, the oscillation output thus amplified is applied to the loudspeaker-and-microphone $SP_1$ through the contact $K_1$, contact $S_{11}$, a line connected between the terminals $T_1$ and $T_{1a}$, thereby to operate the loudspeaker-and-microphone $SP_1$. Therefore, the remote station I can be informed beforehand of the fact that the remote station I is being called by the master station or the master station is ready for receiving a signal or answer from the remote station I.

Even if the station selecting switch $S_1$ were left closed, the armatures of the contacts $K_1$ and $K_2$ would soon be tripped back to the reception sides thereof because, when the capacitor $C_1$ is charged, the transistor Tr becomes non-conductive, and therefore no exciting current flows through the relay RY, as a result of which the armatures of the transfer contacts $K_1$ and $K_2$ are tripped back to the reception sides thereof. Accordingly, the application of the bias to the terminal B of the generator M is interrupted thereby to stop the operation of the generator M. Therefore, the communication between the master and remote stations is no longer subject to interference by the oscillation output produced by the generator. If, upon completion of the conversation between the master and the remote station, the power switch $SW_1$ is opened at the master station, the switch $S_1$ will be simultaneously opened in unison with the opening of the switch $SW_1$. As a result, the circuit for charging the capacitor $C_1$ is interrupted, whereby the capacitor $C_1$ is discharged through the resistors $R_1$ and $R_2$. Thus, the capacitor $C_1$ becomes ready for the next operation.

It is obvious that in the case when the station selecting switch $S_2$ is depressed or closed, the operation of the intercommunicating system is the same as that in the case described above.

The invention described above with respect to an intercommunicating system having a master station and remote stations can be applied to an intercommunicating system in which all of the stations are the same in construction as the master station described above because a calling station and a station called by the calling station can be considered as a master station and a remote station, respectively.

Furthermore, the invention applied to the press-to-talk type intercommunicating system can also be applied to the automatic press-to-talk type intercommunicating system in the same manner as in the former station.

As is apparent from the above description with respect to preferred examples, in the intercommunicating system according to the invention, whenever a station starts its operation the advance notice signal is transmitted therefrom to the line connected between the stations, whereby operators at stations where they are talking to each other can be informed beforehand that someone is listening to their conversation, or the remote station can be informed beforehand that the master station is listening to the remote station. As a result, the eavesdropping accompanying the conventional intercommunicating systems can be eliminated.

Furthermore, the invention has a significant advantage in that it can be readily applied to existing intercommunicating systems which have already been installed.

I claim:

1. An intercommunicating system having a plurality of communication stations, each comprising a transmitter and receiver, said plurality of communication stations being interconnected by a plurality of signal wires, wherein the improvement comprises:

a normally open switch provided for each transmitter, connected in series with said transmitter and a d.c. source, said switch being closed upon activation of the respective communication station;

signal generator means operatively connected to each of said communication stations for automatically providing an advance notice signal of limited time duration to communicating stations when another of said stations becomes operative, in response to a control current provided to said signal generator means by said another of said stations; and a charging circuit comprised of a resistor and capacitor connected in series and provided for each communication station, said charging circuit coupled to said d.c. source through said switch and to said signal generator means to supply thereto the conrol current when said switch is closed said control current being supplied for a limited duration of time equal to the charging time of said capacitor by said d.c. source, whereby said advance notice signal is received by communicating stations for a limited time period.

2. The improvement of claim 1 wherein said signal generator means comprises an oscillator and an amplifier, said oscillator having an output coupled to an input of said amplifier, said charging circuit also coupled to the input of said amplifier, said amplifier being driven into operation by said control current and amplifying said oscillator output.

3. The improvement of claim 1 wherein said signal generator means includes the resistor of said charging circuit, said capacitor being discharged through said resistor after the capacitor has been charged by said d.c. source.

4. An intercommunicating system as claimed in claim 1 in which only one signal generator means is provided for said plurality of intercommunicating stations.

5. An intercommunicating system as claimed in claim 3 in which each of said intercommunicating stations further comprises a diode connected between said capacitor and said transmitter, thereby preventing cross-talk.

6. An intercommunicating system as claimed in claim 5 in which said signal generator means includes a generator provided in each of said plurality of intercommunicating systems, thereby to effect economy in the number of said diodes and the number of the lines to be connected between said intercommunicating stations.

7. An intercommunicating system having a master station and a plurality of remote stations, and including station switching means for selectively connecting said remote stations to said master station, wherein the improvement comprises, said master station having a signal generator means which generates a limited duration advance notice signal when said master staion is activated, said signal being applied to a selected remote station and being generated in response to a short duration input signal to said signal generator means, said master station further including a capacitor operatively connected to said signal generator means and a d.c. source fo supplying said short duration input signal thereto while said capacitor is being charged by said d.c. source.

8. An intercommunicating system as claimed in claim 7 in which said remote stations are the same in organization as said master station.

9. The improvement of claim 7 further comprising a relay and relay switching means, said relay being coupled to said station switching means for operation thereof, said relay switching means being coupled to said relay and said capacitor and causing said relay to switch in response to said capacitor.

10. An intercommunicating system as claimed in claim 9 in which said relay switching means is a switching transistor.

* * * * *